United States Patent [19]

Luebke et al.

[11] 4,347,833
[45] Sep. 7, 1982

[54] PRESSURE COOKING DEVICE WITH EXHAUST AND DRAIN VALVES

[75] Inventors: Clement J. Luebke, Beloit, Wis.; Lowell W. Daniels, Rockford, Ill.

[73] Assignee: Alco Standard Corporation, Valley Forge, Pa.

[21] Appl. No.: 164,245

[22] Filed: Jun. 30, 1980

[51] Int. Cl.³ .............................................. F24D 1/00
[52] U.S. Cl. .................................... 126/369; 126/378; 220/316; 220/347; 219/431; 219/440; 137/637.1
[58] Field of Search ............... 126/369, 389, 376, 377, 126/378; 219/431, 440; 220/316, 243, 247, 329, 347; 137/637.1; 99/403, 407

[56] References Cited

U.S. PATENT DOCUMENTS 2,458,461 1/1949 Young et al. .................. 126/369 X
2,917,200 12/1959 Phelan et al. ...................... 220/316

FOREIGN PATENT DOCUMENTS 2711186 12/1977 Fed. Rep. of Germany ...... 126/369

Primary Examiner—Samuel Scott
Assistant Examiner—Randall L. Green
Attorney, Agent, or Firm—Leydig, Voit, Osann, Mayer & Holt, Ltd.

[57] ABSTRACT

A food product is cooked under pressure and within a bath of hot cooking oil in a vessel when the vessel is sealed closed by a cover. The pressure in the vessel is controlled by an exhaust valve which must be located in an open position before the cover may be closed and sealed. As long as the exhaust valve is closed, it is not possible to open a drain valve and drain the oil from the vessel.

9 Claims, 9 Drawing Figures

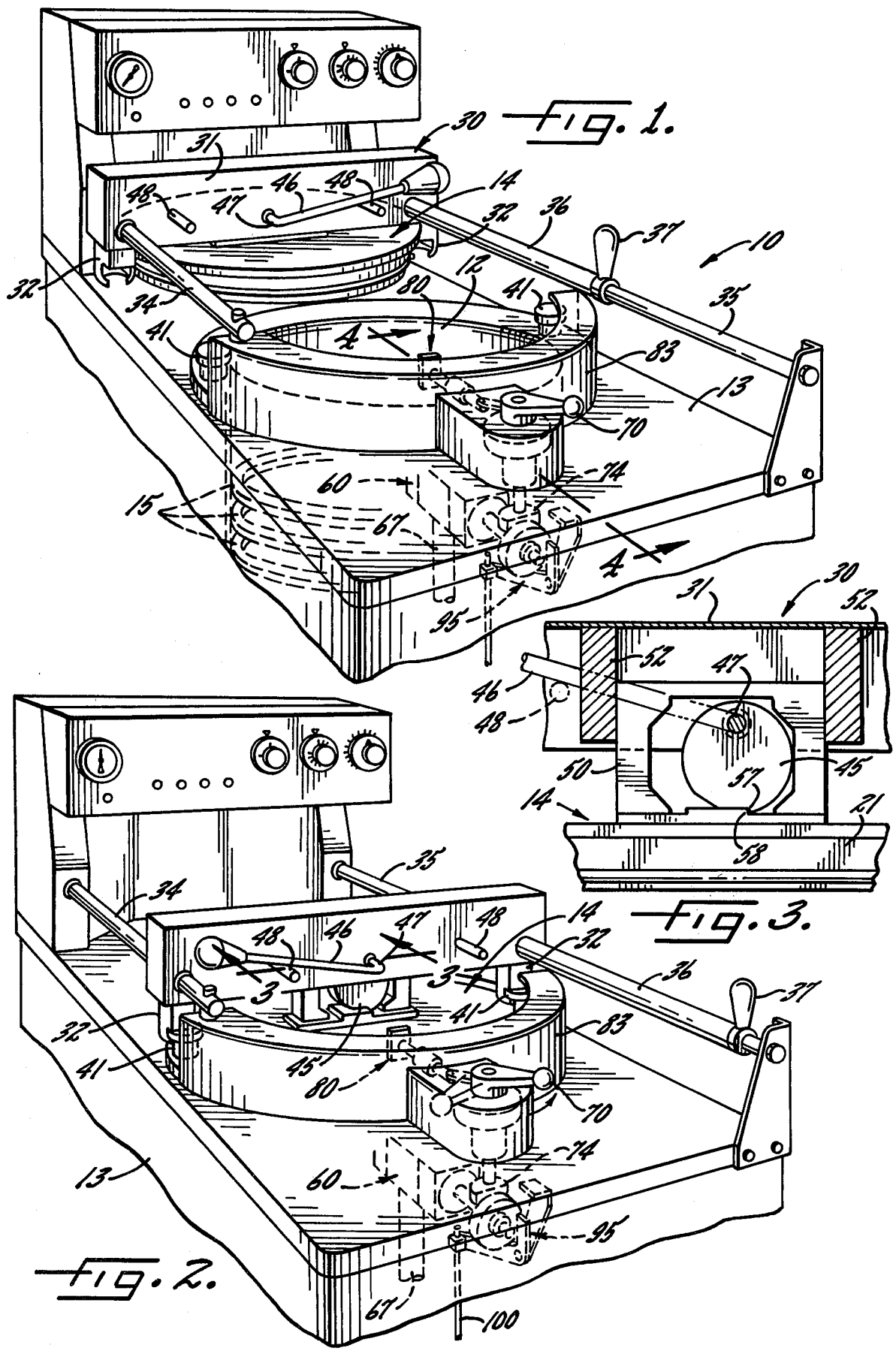

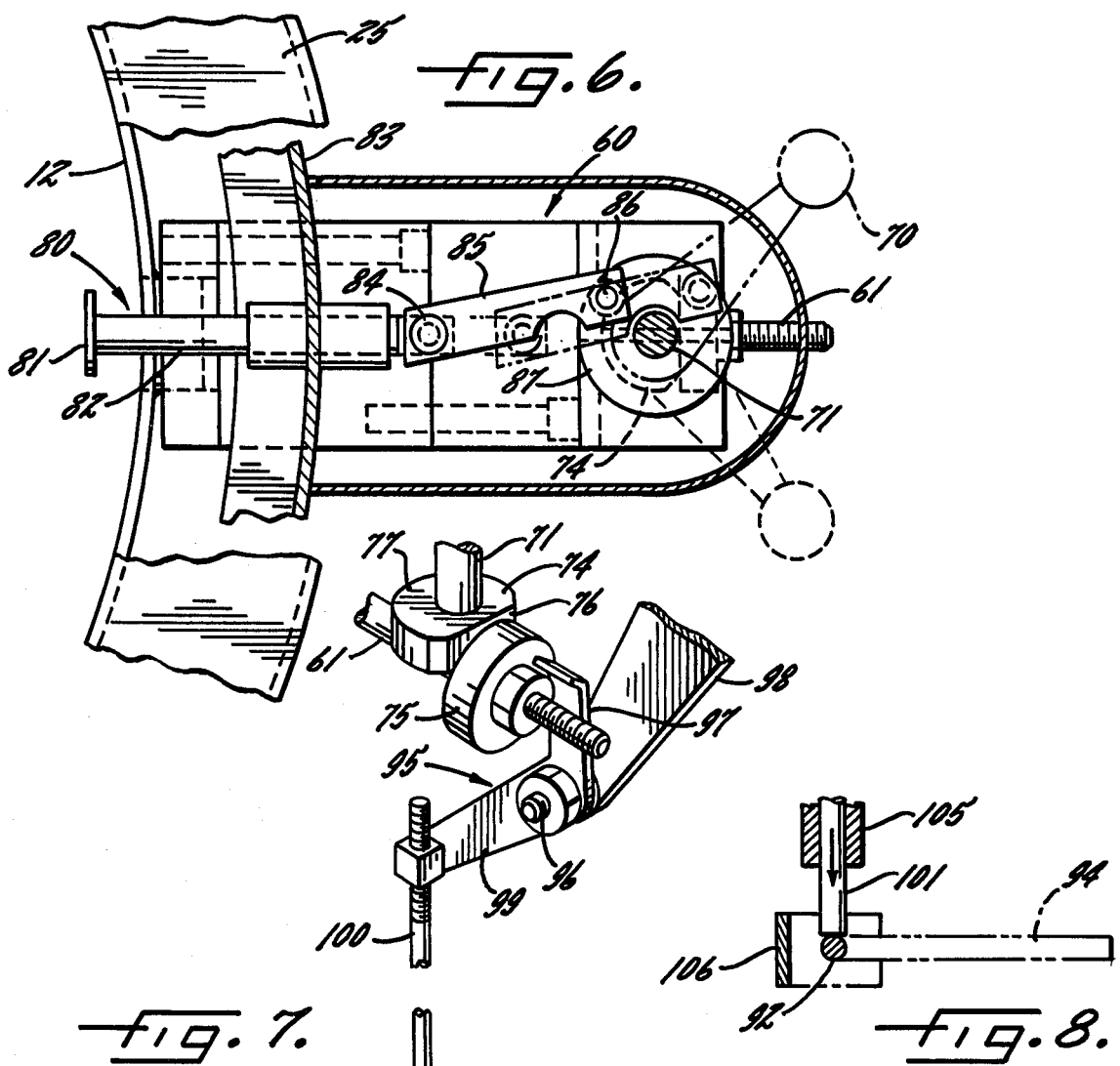
fig. 6.
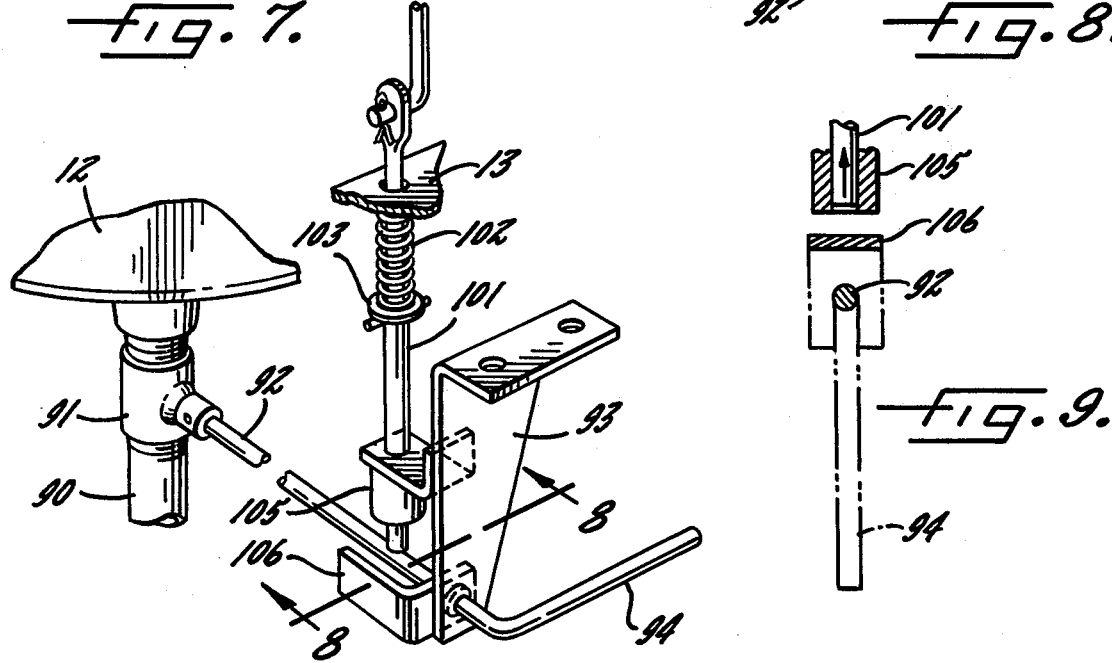
fig. 7.
fig. 8.
fig. 9.

4,347,833

PRESSURE COOKING DEVICE WITH EXHAUST AND DRAIN VALVES

BACKGROUND OF THE INVENTION

This invention relates generally to a cooking device and more particularly to a pressure fryer of the type having a pressure-tight cooking vessel which is adapted to hold a bath of cooking oil and a food product such as chicken. The vessel of such a fryer may be heated either electrically or by a gas burner and is equipped with a removable cover which is adapted to be sealed to the vessel to establish a pressure-tight condition therein.

The fryer is operated by placing a quantity of cooking oil in the vessel, by activating the heater to raise the temperature of the oil, by placing the food product in the vessel and by then sealing the vessel with the cover. Pressure is generated in the vessel as the moisture in the product vaporizes into steam. The pressure which is generated reduces the cooking time and also raises the boiling point of the juices in the product so that flavor is sealed in and less shrinkage occurs.

A pressure exhaust valve is associated with the fryer and acts automatically to hold the pressure in the vessel at a predetermined magnitude. In addition, a drain valve is associated with the fryer and may be opened to enable the cooking oil to be drained from the vessel.

SUMMARY OF THE INVENTION

The general aim of the present invention is to provide a pressure cooking device having a unique pressure exhaust valve which may be manually moved between open and closed positions and which must be located in an open position before the cover of the cooking device can be closed and sealed. As a result, the operator of the cooking device is prevented from closing the cover against pressure in the vessel and thus the possibility of injury to the operator is reduced.

A more detailed object is to achieve the foregoing by providing a pressure cooking device having a manually operable pressure exhaust valve which is automatically shifted to an open position when the cover is moved to a pre-closed position and which cannot be shifted to a closed position until the cover is completely closed and sealed.

A further object of the invention is to provide a pressure cooking device whose drain valve cannot be opened as long as the pressure exhaust valve is in a closed position, the operator of the device thereby being prevented from opening the drain valve if the vessel is under pressure.

These and other objects and advantages of the invention will become more apparent from the following detailed description when taken in conjunction with the accompanying drawings.

BRIEF DESCRIPTION OF THE DRAWINGS

FIG. 1 is a fragmentary perspective view of a new and improved pressure fryer incorporating the unique features of the present invention, the cover of the fryer being shown in a fully open position.

FIG. 2 is a view similar to FIG. 1 but shows the cover in a fully closed and sealed position.

FIG. 3 is an enlarged fragmentary cross-section taken substantially along the line 3—3 of FIG. 2.

FIG. 6 is a fragmentary cross-section taken substantially along the line 6—6 of FIG. 4.

FIG. 7 is a perspective view of the actuator and the safety lock for the drain valve.

FIG. 8 is a fragmentary cross-section taken substantially along the line 8—8 of FIG. 7.

FIG. 9 is a view similar to FIG. 8 but shows certain parts in moved positions.

DETAILED DESCRIPTION OF THE PREFERRED EMBODIMENT

Figure 4:
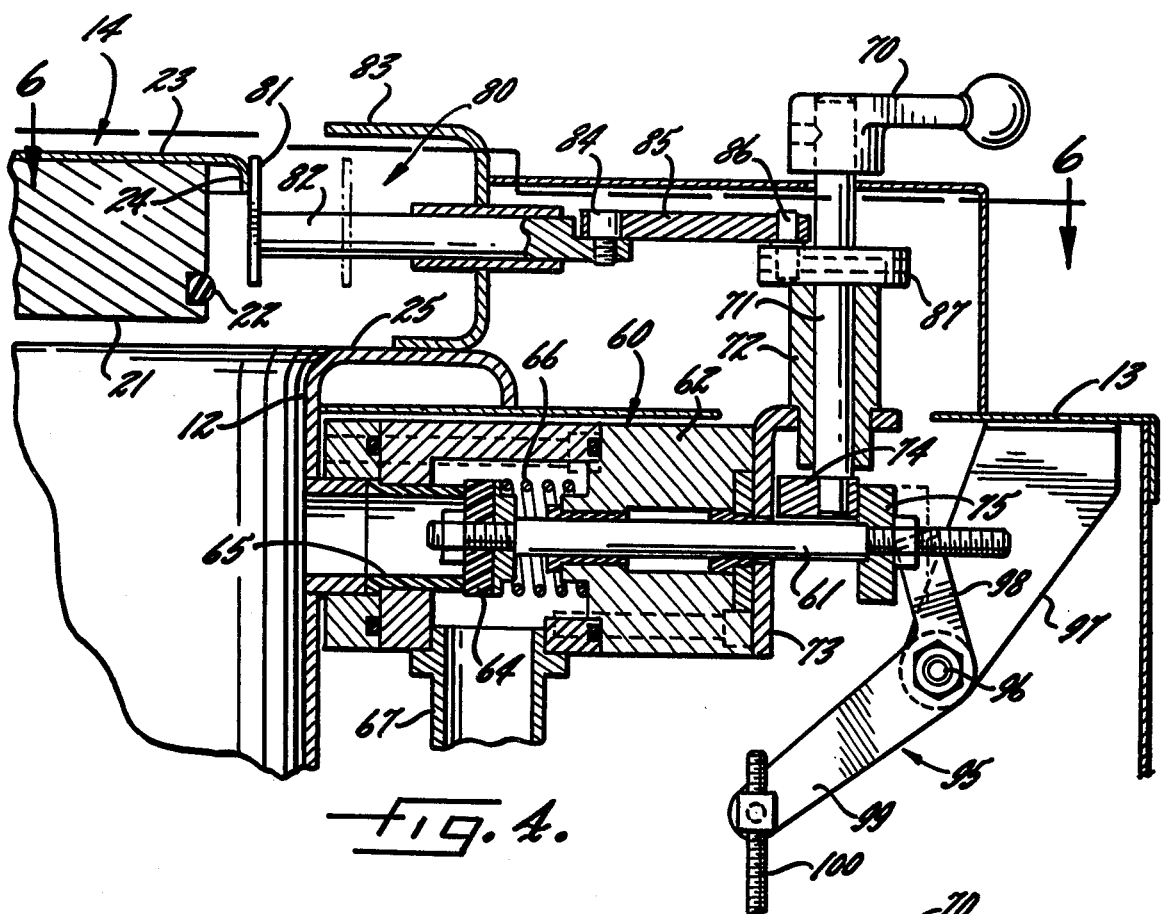
FIG. 4 is an enlarged fragmentary cross-section taken substantially along the line 4—4 of FIG. 1 and shows the cover being moved toward a pre-closed position.

As shown in the drawings for purposes of illustration, the invention is embodied in a cooking device which preferably is in the form of a pressure fryer 10 adapted to be used for cooking chicken, fish, potatoes and other food products under pressure and in a bath of hot cooking oil. In general, the fryer 10 comprises an open top stainless steel vessel 12 (FIGS. 1 and 4) supported by a base or cabinet 13 and defining a cooking well. The vessel is adapted to be sealed in a pressure-tight condition by a removable cover 14. Disposed within the lower portion of the vessel is an array of ring-like electrical resistance heating elements 15 adapted to be energized from an a.c. voltage source. Alternatively, the vessel may be heated by a gas-fired burner located outside of the vessel.

To use the fryer 10, the vessel 12 is filled with a suitable cooking oil and then the heating elements 15 are energized to raise the oil to a predetermined temperature (e.g., 360 degrees F.). Alternatively, solid shortening may be placed in the vessel and may be melted and heated to the required temperature by the heating elements.

After the oil has been heated, the chicken or other food product is placed in a wire mesh basket (not shown) which is immersed in the oil in the vessel 12. Thereafter, the cover 14 is placed on the top of the vessel and is sealed. During the cooking process, the moisture in the food product vaporizes and creates pressure in the vessel. Such pressure shortens the cooking time and also enhances the quality of the cooked product.

When the product has cooked for a predetermined period of time, the heating elements 15 are de-energized and the pressure within the vessel 12 is exhausted. After the pressure drops, the cover 14 is opened to enable removal of the product.

Herein, the cover 14 comprises a rather massive cylindrical body 21 (FIG. 4) which is adapted to telescope downwardly into the vessel 12. An O-ring 22 encircles the body 21 adjacent the lower end thereof and serves to establish a pressure-tight seal between the body and the inside of the vessel. A stainless steel plate 23 is secured to the top of the body and is formed with a downwardly projecting peripheral skirt 24. When the cover is fully closed and sealed, the skirt either engages or is disposed in close proximity to an outwardly projecting flange 25 which is formed around the top of the vessel 12 (see FIG. 5).

The cover 14 is mounted on a transversely extending support or yoke 30 (FIG. 1) which is formed by a box-like sheet metal housing 31 and by a pair of sleeves 32 depending from opposite ends of the housing. The yoke is adapted to be moved forwardly and rearwardly of the cabinet 13 along a pair of horizontal guide rods 34 and 35 which extend through the housing 31 and the sleeves 32. A forwardly extending tube 36 is fastened to one end of the housing 31 and is telescoped slidably over the guide rod 35. By pulling or pushing on a handle 37 on the forward end of the tube, the yoke 30 and the cover 14 may be shifted forwardly and rearwardly along the guide rods.

When the yoke 30 is in its rearward position shown in FIG. 1, the cover 14 is spaced rearwardly of the vessel 12 and is disposed in an open position allowing full access to the vessel for the purpose of placing product in or removing product from the vessel. When the yoke is pulled forwardly, the cover 14 overlies the vessel 12 but is located in a pre-closed or non-sealing position with the body 21 spaced upwardly from the vessel as shown in phantom lines in FIG. 5. The lower ends of the sleeves 32 interfit with latching posts 41 (FIG. 2) when the cover is in its forward position. The latching posts project upwardly from the flange 25 of the vessel 12.

Figure 5:
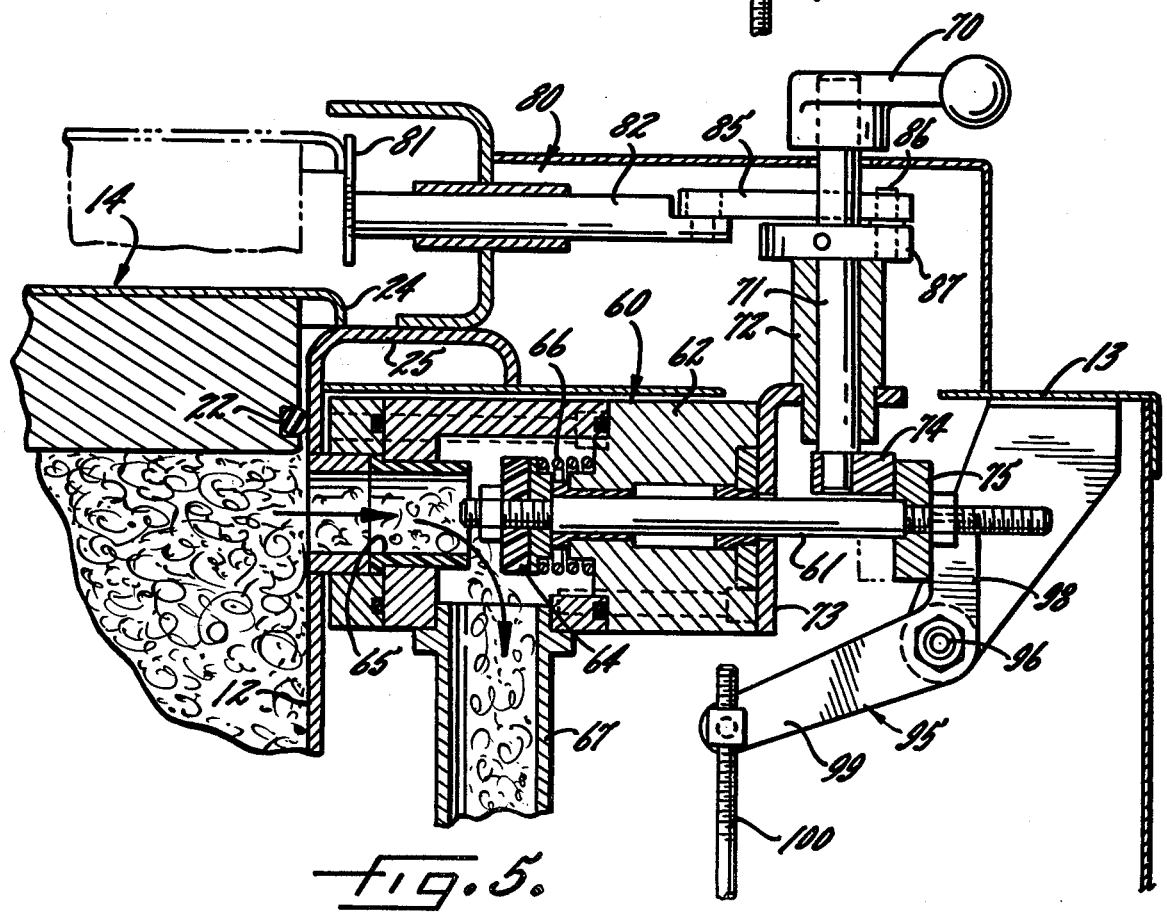
FIG. 5 is a view similar to FIG. 4 but shows the cover in a fully closed and sealed position.

The cover 14 is adapted to be moved vertically between its non-sealing position shown in phantom lines in FIG. 5 and a sealing position shown in solid lines in FIG. 5. The body 21 is telescoped downwardly into and seals against the vessel 12 when the cover is in its sealing position. The cover is shifted between its non-sealing and sealing positions by manually turning an actuator. In the present instance, the actuator includes a cam 45 (FIGS. 2 and 3) in the form of a substantially circular disc. A crank or handle 46 is formed with a right-angle shaft portion 47 which is secured to the disc at a position radially offset from the central axis thereof. The shaft portion 47 of the handle 46 is rotatably supported by the housing 31 of the yoke 30 and thus the cam 45 is supported for eccentric rotation within the housing. The handle 46 is adapted to be swung from a cover-open position shown in FIG. 1 to a cover-closed position shown in FIGS. 2 and 3 and, in each position, the handle engages a stop pin 48 which projects forwardly from the housing.

As shown in FIG. 3, the cam 45 is positioned within a lifter box 50 which forms part of the cover 14 and which is secured rigidly to the body 21. The lifter box is guided for up and down sliding relative to the yoke 30 by a pair of transversely spaced rails 52 located within the housing 31.

When the cover 14 is in its non-sealing position shown in phantom lines in FIG. 5 and the actuator handle 46 is turned counterclockwise, the peripheral surface of the cam 45 engages and bears against the bottom of the lifter box 50. Such engagement causes the lifter box to slide downwardly relative to the rails 52 and forces the body 21 of the cover 14 downwardly into the vessel 12 to its sealing position shown in solid lines in FIG. 5. When the handle 46 is turned in a clockwise direction, the peripheral surface of the cam 45 engages the top of the lifter box and forces the cover upwardly to its non-sealing position. Accordingly, the cover is lowered and raised between its non-sealing and sealing positions by turning the handle 46 to rotate the cam 45.

The cover 14 coacts with the cam 45 to prevent the actuating handle 46 from being turned from its cover-closed position to its cover-open position as long as there is any substantial pressure in the vessel 12. For this purpose, the bottom of the lifting box 50 is formed with an upwardly projecting latching shoulder 57 (FIG. 3) which is adapted to engage a circumferentially facing latching shoulder 58 formed on the periphery of the cam 45. When the two shoulders 57 and 58 are in engagement, it is not possible to turn the cam in a clockwise direction to shift the cover upwardly out of its sealing position. The specific operation of the latching shoulders is disclosed in detail in our copending application Ser. No. 164,244, filed June 30, 1980, entitled Cooking Device With Cover Locking Means and assigned to the assignee of the present invention.

The pressure in the vessel 12 is maintained at a predetermined magnitude (e.g., 12 p.s.i.) during the cooking operation by a pressure exhaust valve 60. As shown in FIG. 4, the exhaust valve includes a stem 61 which is slidably mounted within a housing 62 attached to the outside of the vessel 12 adjacent the upper end thereof and beneath the top of the cabinet 13. A valve disc 64 is fastened to the inner end of the stem and is adapted to seat against and close off an exhaust tube 65 extending from the vessel and communicating with the interior of the vessel. Telescoped over the stem is a coil spring 66 which is compressed between the disc 64 and part of the housing 62. The spring urges the valve to a closed position in which the disc 64 seals against and closes off the end of the exhaust tube 65 to hold pressure in the vessel. When the pressure reaches about 12 p.s.i., the force of the spring is overcome and thus the valve disc is automatically moved away from the exhaust tube to relieve the pressure. Steam which is vented from the vessel is exhausted through a drain tube 67 leading from the lower side of the housing 62 and communicating with a drain container (not shown).

In accordance with one aspect of the present invention, the pressure exhaust valve 60 is adapted to be moved manually between its open and closed positions and, if the cover 14 is in its unsealed position, the valve is prevented from being moved to its closed position until the cover is fully closed and sealed. In this way, pressure cannot build up in the vessel 12 while the cover is being closed and thus the operator of the fryer 10 is protected against injury which might otherwise result if pressure forced the cover upwardly.

More specifically, the exhaust valve 60 may be manually opened and closed by turning a handle member 70 (FIG. 4) which is secured to an upright shaft 71. The latter is journaled in a bushing 72 which, in turn, is supported by a bracket 73 attached to the outer end of the valve housing 62. A cam 74 (FIG. 7) is secured rigidly to the lower end of the shaft 71 and engages a collar 75 which is fastened securely to the outer end portion of the valve stem 61.

When the handle 70 is located in the position shown in FIGS. 1 and 4, a flat 76 (FIG. 7) on the cam 74 engages the collar 75 and permits the valve stem 61 to slide inwardly under the urging of the spring 66 so that the valve disc 64 may close against the exhaust tube 65. The cam does not interfere with outward sliding of the stem when pressure in the vessel 12 urges the valve disc 64 away from the exhaust tube 65 and thus the valve may regulate automatically to maintain the desired pressure in the vessel.

When the handle 70 is turned clockwise from the position shown in full lines in FIG. 2 to the position shown in phantom lines, a curved surface 77 (FIG. 7) on the cam 74 engages the collar 75 and forces the valve stem 61 outwardly. As a result, the valve disc 64 is pulled away from the exhaust tube 65 and is held in an open position by the cam 74.

In carrying out the invention, the exhaust valve 60 cannot be closed if the cover 14 is merely above the vessel 12 and has not been moved downwardly to its fully closed and sealed position. Moreover, the valve 60 will be automatically opened by the cover if the valve should happen to be closed when the cover is slid forwardly from its fully open position shown in FIG. 1. For these purposes, a feeler element 80 (FIG. 4) projects into the path of the cover 14. Herein, the feeler 80 comprises a generally rectangular plate 81 which is mounted on the inner end of a rod 82. The latter is mounted for back and forth sliding by a steam shield 83 secured to the top of the cabinet 13 and encircling the forward half of the vessel 12. The outer end of the rod 80 is pivotally connected at 84 (FIG. 4) to one end of a link 85 whose other end is pivotally connected to a pin 86. The pin is rigid with and projects upwardly from a disk 87 secured rigidly to the shaft 71 and supported on the upper side of the bushing 72.

With the foregoing arrangement, the feeler 80 is pushed inwardly by the link 84 to the position shown in FIGS. 4 and 6 when the handle 70 is turned counterclockwise to close the valve 60. When the feeler is in this position, the plate 81 is located over the vessel 12 and is disposed in the path which the cover 14 must follow to move from the fully open position shown in FIG. 1 to the position shown in phantom lines in FIG. 4.

Assume that the cover 14 is fully open as shown in FIG. 1 and that the handle 70 has inadvertently been turned in a counterclockwise direction to close the valve 60. Under these circumstances, the valve and the feeler 85 will be positioned as shown in FIG. 4. When the cover is pulled forwardly from the position shown in FIG. 1, the skirt 24 of the cover engages the plate 81 of the feeler (see FIG. 4) and pushes the feeler outwardly. The feeler acts through the link 84 and turns the handle 70 clockwise to open the valve 60. Accordingly, the valve is opened automatically by the cover when the latter is moved from its fully open position and the valve is in its closed position.

If the operator of the fryer 10 attempts to turn the handle 70 and close the valve 60 while the cover 14 is in its unsealed position, the plate 81 of the feeler 80 engages the skirt 24 of the cover 14 as shown in phantom lines in FIG. 5 and prevents turning of the handle and closing of the valve. Thus, the cover cannot be moved downwardly to its sealed position while the valve is closed.

As the cover 14 is moved downwardly, the O-ring 22 engages the inside of the vessel 12 and seals the top of the vessel. There is, however, no pressure in the vessel since the exhaust valve 60 is open. Accordingly, the operator may move the cover downwardly to its fully sealed position shown in FIG. 5 without closing the cover against pressure and without being exposed to a potentially dangerous condition. Once the cover has been fully sealed, the top of the cover is located below the plate 81 of the feeler 80 and thus the valve 60 can be closed by the handle 70 to enable pressurization of the vessel 12 and initiation of the cooking cycle. After the cooking cycle has been completed, the valve may be manually opened with the handle to release the pressure in the vessel and permit opening of the cover.

From the foregoing, it will be apparent that the feeler 80 prevents the exhaust valve 60 from being closed until the cover 14 has been shifted downwardly from its unsealed position to its fully sealed position. If the valve for some reason is moved to its closed position between cooking cycles and while the cover is fully open, the cover automatically opens the valve when the cover is slid forwardly to a position above the vessel 12.

Located at the bottom of the vessel 12 is a drain pipe 90 (FIG. 7) which permits cooking oil to be drained from the vessel. A valve 91 is disposed within the drain pipe and is adapted to be moved manually between open and closed positions. For this purpose, a rod 92 is connected to the drain valve and is rotatably supported by a bracket 93 which is connected to the cabinet 13. A right-angled handle 94 is formed integrally with the rod 92 and is adapted to be turned clockwise from the horizontal position shown in FIGS. 7 and 8 to the vertical position shown in FIG. 9 to open the drain valve 91.

Further in accordance with the invention, the drain valve 91 is prevented from being opened as long as the exhaust valve 60 is in its closed position. As a result, it is impossible to drain the vessel 12 if the vessel is under pressure.

To achieve the foregoing, a bellcrank 95 (FIG. 7) is pivotally mounted at 96 on a bracket 97 which is connected to the cabinet 13. One arm 98 of the bellcrank is located just ouwardly of the collar 75 on the valve stem 61 while the other arm of the bellcrank is connected to the upper end of a generally vertical, L-shaped rod 100. The lower end of the rod 100 is pivotally connected to the upper end of a rod-like plunger member 101 which is supported for up and down sliding by the cabinet 13. A coil spring 102 is compressed between the cabinet and a fixed collar 103 on the plunger 101 and urges the plunger and the rod 100 downwardly. As a result, the bellcrank 95 is biased in a counterclockwise direction about the pivot 96 and thus the arm 97 of the bellcrank is pressed into engagement with the collar 75 on the valve stem 61.

The lower end portion of the plunger 101 is guided for up and down sliding by a bushing 105 (FIG. 7) which is supported by the bracket 93. The lower end of the plunger 101 overlies the actuating rod 92 of the drain valve 91 and is pressed into engagement with the rod 92 by the spring 102 when the exhaust valve 60 is closed. When the plunger 101 engages the rod 92, the plunger is disposed in the path of an L-shaped stop member 106 which is attached rigidly to the rod 92.

When the exhaust valve 60 is open, the collar 75 causes the bellcrank 95 to be turned clockwise about the pivot 96 (see FIG. 5) and the plunger 101 thus is pulled upwardly to the position shown in FIG. 9. When the plunger is retracted upwardly, its lower end is located above the path followed by the stop 106 on the actuating rod 92. Accordingly, the rod may be rotated clockwise through ninety degrees by turning the handle 94 and thus the drain valve 91 may be opened.

When the exhaust valve 60 is in a closed position, the collar 75 allows the bellcrank 95 to turn counterclockwise about the pivot 96 under the urging of the spring 102. The lower end of the plunger 101 thus is forced downwardly to a latching position in engagement with the actuating rod 92 and in the path of the stop 106. As a result, the plunger 101 engages and blocks the stop 106 and prevents the rod 92 and the handle 94 from being turned sufficiently far in a clockwise direction to open the drain valve 91. Thus, it is not possible to open the drain valve if the exhaust valve 60 is closed and there is a possibility that the vessel 12 is under pressure.

We claim:

1. A cooking device comprising a base, an open-topped vessel mounted on said base and adapted to hold liquid, a cover for selectively closing and sealing said vessel, means for heating the liquid to create pressure in said vessel when the latter is sealed, means mounting said cover on said base for downward and upward shifting between an unsealed position and a sealed position, said cover being disposed in vertically aligned but non-telescoping and non-sealing relation with the open top of said vessel when said cover is in said unsealed position, said cover telescoping with said vessel and closing and sealing said vessel when said cover is in said sealed position, a pressure exhaust valve associated with said vessel and movable between a closed position permitting pressure to build up in said vessel and an open position relieving the pressure in said vessel, a manual member which is operable when shifted manually to move said valve between its positions, and safety means engageable with said cover for preventing said manual member from being shifted to move said valve to its closed position as long as said cover is in its unsealed position.

2. A cooking device comprising a base, an open-topped vessel mounted on said base and adapted to hold liquid, a cover assembly for selectively closing and sealing said vessel, and means for heating the liquid to create pressure in said vessel when the latter is sealed, said cover assembly comprising a support and further comprising a cover connected to said support, means mounting said cover assembly on said base for horizontal movement between an open position in which said cover permits access to said vessel and an unsealed position in which said cover is disposed in overlying but non-telescoping and non-sealing relation with said vessel, means mounting said cover on said support for downward and upward shifting between said unsealed position and a sealed position, said cover telescoping with said vessel and closing and sealing said vessel when said cover is in said sealed position, a pressure exhaust valve associated with said vessel and movable between a closed position permitting pressure to build up in said vessel and an open position relieving the pressure in said vessel, a manual member which is operable when shifted manually to move said valve between its positions, and safety means engageable with said cover (a) for shifting said valve to its open position if said valve is in its closed position as said cover is moved from its open position to its unsealed position and (b) for preventing said manual member from being shifted to move said valve to its closed position as long as said cover is in its unsealed position.

3. A cooking device as defined in claim 2 in which said safety means includes an element operably connected to said valve and disposed within the path followed by said cover as the latter is moved from its open position to its unsealed position when said valve is in its closed position, said element overlying said cover when said cover is in its sealing position and said valve is in its closed position.

4. A cooking device as defined in claim 3 in which said element comprises a feeler mounted on said base to slide horizontally back and forth in the directions of horizontal movement of said cover, said manual member being mounted on said base to turn about an upright axis, and means connecting said feeler to said manual member and operable to slide said feeler back and forth when said manual member is turned first in one direction and then the other.

5. A cooking device as defined in claim 2 further including means connecting said valve to said manual member and operable to open and close said valve when said manual member is turned first in one direction and then the other, said last-mentioned means permitting said valve to open automatically when said manual member is positioned to close said valve and the pressure in said vessel reaches a predetermined magnitude.

6. A cooking device as defined in claim 2 further including a drain valve associated with said vessel and adapted to be moved to an open position to allow liquid to be drained from said vessel, and means responsive to the position of said pressure exhaust valve and preventing said drain valve from being moved to its open position as long as said pressure exhaust valve is in its closed position.

7. A cooking device comprising a base, an open-topped vessel mounted on said base and adapted to hold liquid, a cover for selectively closing and sealing said vessel, means for heating the liquid to create pressure in said vessel when the latter is sealed, a pressure exhaust valve associated with said vessel and movable between a closed position permitting pressure to build up in said vessel and an open position relieving the pressure in said vessel, a drain valve associated with said vessel and adapted to be moved to an open position to allow liquid to be drained from said vessel, and means responsive to the position of said pressure exhaust valve for preventing said drain valve from being moved to its open position as long as said pressure exhaust valve is in its closed position.

8. A cooking device as defined in claim 7 in which said last-mentioned means comprises a member which is operably connected to said pressure exhaust valve and which is moved between latched and unlatched positions when said pressure exhaust valve is moved between its closed and open positions, respectively, said member being operable when in said latched position to hold said drain valve against movement to its open position.

9. A cooking device as defined in claim 7 in which said cover is mounted for downward and upward shifting above said vessel between an unsealed position and a sealed position with respect to said vessel, and means for preventing said exhaust valve from being shifted to its closed position as long as said cover is in its unsealed position.

* * * * *